US012011325B2

(12) United States Patent
Kerbage et al.

(10) Patent No.: US 12,011,325 B2
(45) Date of Patent: Jun. 18, 2024

(54) SYSTEM AND METHOD FOR TREATMENT OF PERIODONTIC POCKETS USING DISPOSABLE INSERTS

(71) Applicant: Convergent Dental, Inc., Needham, MA (US)

(72) Inventors: Charles Kerbage, Arlington, MA (US); Stephen Couitt, Auburndale, MA (US); Roni Cantor-Balan, Natick, MA (US)

(73) Assignee: Convergent Dental, Inc., Waltham, MA (US)

( * ) Notice: Subject to any disclaimer, the term of this patent is extended or adjusted under 35 U.S.C. 154(b) by 0 days.

(21) Appl. No.: 16/834,424

(22) Filed: Mar. 30, 2020

(65) Prior Publication Data
US 2020/0345453 A1 Nov. 5, 2020

Related U.S. Application Data

(60) Provisional application No. 62/838,044, filed on Apr. 24, 2019.

(51) Int. Cl.
*A61C 1/00* (2006.01)
*G02B 3/06* (2006.01)
*H01S 3/223* (2006.01)

(52) U.S. Cl.
CPC ............. *A61C 1/0046* (2013.01); *G02B 3/06* (2013.01); *H01S 3/2232* (2013.01)

(58) Field of Classification Search
CPC ....... A61C 1/0046; G02B 3/06; H01S 3/2232; A61B 2018/2255–2277; A61B 2018/2285
See application file for complete search history.

(56) References Cited

U.S. PATENT DOCUMENTS

| | | | | |
|---|---|---|---|---|
| 5,242,438 | A * | 9/1993 | Saadatmanesh | A61B 18/24 606/7 |
| 6,104,853 | A * | 8/2000 | Miyagi | A61B 18/22 385/125 |
| 9,040,131 | B2 * | 5/2015 | DeWit | A61B 18/201 428/34.1 |
| 2005/0080404 | A1 * | 4/2005 | Jones | A61C 1/0046 606/16 |

(Continued)

FOREIGN PATENT DOCUMENTS

| | | |
|---|---|---|
| DE | 19804732 | 8/1998 |
| JP | 03-112549 | 5/1991 |

(Continued)

OTHER PUBLICATIONS

International Preliminary Report on Patentability for PCT/US2020/025726, 8 pages.

*Primary Examiner* — Cris L. Rodriguez
*Assistant Examiner* — Drew S Folgmann
(74) *Attorney, Agent, or Firm* — Goodwin Procter LLP

(57) ABSTRACT

A system and method for dental or surgical treatment of oral tissue, the system including a laser source; a hand piece; and a device for directing radiation emitted by the laser source to a treatment area (e.g., an oral treatment area), the device further including a disposable tube attachable to the hand piece and an optical element (e.g., a substantially cylindrical lens) mounted within the disposable tube and adapted to modify a profile and/or a direction of the radiation emitted from the tube.

21 Claims, 7 Drawing Sheets

(56) References Cited

U.S. PATENT DOCUMENTS

| | | | |
|---|---|---|---|
| 2009/0130622 A1* | 5/2009 | Bollinger | A61C 1/0046 433/29 |
| 2014/0134568 A1* | 5/2014 | Heinrich | A61C 17/0217 433/29 |
| 2014/0309627 A1* | 10/2014 | Hanley | A61B 18/24 606/15 |
| 2015/0272676 A1* | 10/2015 | Hasenberg | A61B 18/22 606/15 |
| 2016/0262597 A1* | 9/2016 | Danchinyu | A61B 1/042 |
| 2018/0333205 A1* | 11/2018 | Paamand | G02B 6/262 |
| 2019/0175408 A1* | 6/2019 | Diao | A61B 90/30 |

FOREIGN PATENT DOCUMENTS

| | | |
|---|---|---|
| JP | 08-275956 | 10/1996 |
| JP | 2003310639 | 11/2003 |

* cited by examiner

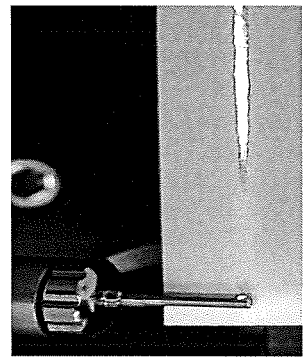
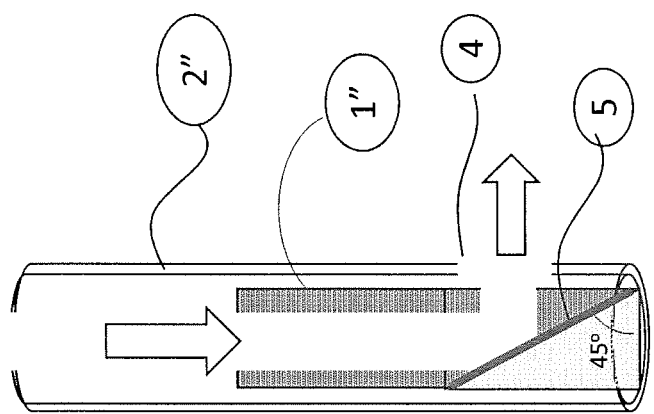

FIGURE 8.

| FEATURE | Min. Value | Nominal value | Max. Value | Unit |
|---|---|---|---|---|
| Laser (CO2) | | | | |
| Wavelength | 9 | 9.3 | 11 | microns |
| Pulse energy | 1 | 20 | 45 | mJ |
| Pulse duration | 1 | 25 | 140 | μsec |
| Pule repetition rate | 0.05 | 0.2 | 1 | kHz |
| Laser beam overlap | 0 | 0.5 | 1 | mm |
| Power | 0.1 | 3 | 10 | W |
| Housing | | | | |
| Outer diameter | 0.3 | 0.7 | 2 | mm |
| Inner diameter | 0.2 | 0.5 | 1.7 | mm |
| Length | 5 | 12 | 35 | mm |
| Size of opening in side | 0.19 | 0.28 | 0.78 | mm^2 |
| Optical Element | | | | |
| Outer diameter | 0.1 | 0.6 | 1.9 | mm |
| Radius of curvature | -100 | 0.5 | 100 | mm |
| Length | 1 | 2 | 5 | mm |
| Reflective surface angle | 15 | 45 | 90 | deg. |
| Refractive index (n1) | 1.3 | 2.2 | 2.4 | |
| Refractive index (n2) | 1.3 | 2.2 | 2.4 | |
| Cone angle | 5 | 15 | 60 | deg. |

SYSTEM AND METHOD FOR TREATMENT OF PERIODONTIC POCKETS USING DISPOSABLE INSERTS

CROSS-REFERENCE TO RELATED APPLICATIONS

This application claims priority to and the benefit of U.S. Provisional Patent Application No. 62/838,044 filed on Apr. 24, 2019, the entire disclosure of which is incorporated in its entirety by reference herein.

FIELD OF THE INVENTION

The present invention generally relates to dental and surgical treatment of tissue using a light-emitting device (e.g., a laser source), and, more particularly, to dental and surgical treatment of tissue using a device, system, and/or method for directing radiation emitted by a laser source to an oral treatment area.

BACKGROUND OF THE INVENTION

The treatment of periodontal disease presents a number of challenges for the clinician on a clinical level, as well as on a patient management level. In the pathogenesis of periodontal diseases, subgingival complex bacterial biofilm may induce inflammation that leads to, inter alia, connective tissue degradation and bone resorption around the teeth. Hence, pain management, reattachment of connective tissue, control of bacteria and endotoxins, and effective removal of subgingival calculus deposits without root surface damage pose clinical challenges.

Standard processes of cleaning and disinfecting root surfaces in periodontal therapy may include mechanical debridement of the biofilm, which may require removal of bacteria and calculus from the root surfaces of affected teeth: this process is referred to as "scaling and root planing" or "root debridement." Conventionally, hand instruments and/or ultrasonic (i.e., high frequency) instruments may be used to carry out the necessary procedure. However, disadvantageously, the procedure is highly invasive and requires a health care professional with a high level of skill and tactile sensitivity.

For minimally invasive procedures that, for example, may involve killing bacteria, reducing pockets, removing subgingival tissue calculus deposits, and/or repairing damage with an easy access to the pocket, laser-assisted therapies in the oral cavity have been used and have been effective. Laser-assisted therapies have also been used to remove carious lesions and to prepare a tooth for a restoration. More recently, light-emitting devices (e.g., lasers) have demonstrated promising clinical outcomes for treating of periodontitis and peri-implantitis. Accordingly, there are many potential benefits of using light-emitting devices (e.g., lasers) as a therapeutic tool in dentistry.

Laser use has also been useful as an adjunct for non-surgical debridement of bacteria from root surfaces. For example, a Neodymium:Yttrium-Aluminum-Garnet (Nd:YAG) laser has been used in the treatment of periodontitis, providing the ability to carry out subgingival curettage, as well as in the removal of subgingival plaque and calculus from infected root surfaces. Periodontal tissues typically have varying water, content, mineral content, pigment density, and tissue density, which allow them to absorb the emitted beams from Nd:YAG and diode-type lasers.

Lasers that operate using wavelengths in the near-infrared range (780 nm to 2500 nm) or in parts of the mid-infrared range (2500 nm to 10 μm) are often used in combination with fiber optic beam delivery systems, including, for example, silica, fluoride-doped silica, indium fluoride, and zirconium fluoride optical fibers. For example, laser diodes and Nd:YAG lasers that operate at a wavelength of about 1 μm (or micron) may be coupled to an optical fiber that transmits these wavelengths and, as a result, may be used in clinical procedures for soft tissue incision, excision, and/or ablation. Fiber delivery systems have also used Er:Yttrium Scandium Gallium Garnet (ER:YSGG) lasers in endodontic and periodontic procedures; as it is easy to cleave or design the tip of the fiber in a way to provide access to the pocket, as well as to enable directing the focus of the laser beam to a discrete location (e.g., between the teeth, between teeth and gingiva, and so forth).

The use of these laser types, however, may result in damage to healthy tissue, beneath the tissue being treated, for which treatment is undesirable. Thus, these laser types have demonstrated notable drawbacks. Additionally, delivery of a laser-generated beam to the treatment area remains quite challenging.

Infrared lasers in the 9-10 micron range (i.e., in the upper portion of the mid-infrared wavelength range) have also been found to be well absorbed by many biological substances, including hydroxyapatite in hard tissue and water and collagen in soft tissue. In particular, $CO_2$ lasers in the 9-10 micron range can be fast and effective enough for clinical applications to remove hard and soft tissue. Advantageously, $CO_2$ lasers generally have smaller optical penetration depths, which mitigate or avoid the risk of damaging underlying tissue that is not to be treated. However, an important limitation of all lasers operating in the upper portions of the near-infrared and far-infrared wavelength spectrum, including $CO_2$ lasers, is the lack of a clinically-viable optic beam delivery system that can access the periodontic pocket and direct light in a specific direction to treat the walls of the pockets and the implants as part of, for example, a closed-flap procedure.

As a result, due to a lack of a suitable, efficient beam delivery system, in challenging areas, especially in connection with periodontic and endodontic procedures, to date the clinical use of lasers operating in the 9-10 micron wavelength range has been limited to certain applications. More specifically, for certain applications, problems with laser use in the 9-10 micron wavelength range may include that: waveguides and articulating arms tend to be cumbersome and lossy and many optical fibers cannot transmit radiation in the 9-10 micron range, without damaging the optical fibers.

Chalcogenide fibers typically are able to transmit radiation at wavelengths greater than 10 microns (e.g., 10.6 microns). However, chalcogenide fibers may cause transmission losses and/or losses due to a change in refractive index due to a change in temperature. For example, some chalcogenide glass fibers may cause transmission losses between 60%-80% at these wavelengths. Although silver halide optical fibers are able to transmit radiation in the 9-10 micron wavelength range, such fibers are not clinically viable as they are not biocompatible or safe to use in the human body.

As an alternative to optical fibers, hollow core waveguides may be used in combination with some $CO_2$ laser systems operating at a wavelength of 10.6 microns. However, these systems lose approximately one-quarter to one-third of the laser power within the hollow waveguide.

SUMMARY OF THE INVENTION

In view of the foregoing, it would be desirable to provide a method and system for enabling periodontic and endodontic procedures using a laser source (e.g., a $CO_2$ laser) operating in the 9-10 micron wavelength range.

The present invention includes different designs with special and optimized geometries for directing radiation (e.g., a laser beam) in the near- to far-infrared spectra, especially in the 9-10 μm wavelength range, to allow for treatment of dental disease in the oral cavity such as periodontic pocket treatment, implantogology, or endodontic procedures to disinfect tissues with root canal passages and tubules. Such tools allows for minimally invasive flapless surgery in lieu of conventional open flap surgery.

In some embodiments, aspects of the present invention include periodontal laser tips, especially, radially-firing periodontal laser tips, that have the potential to deliver laser energy to diseased root surfaces and to periodontal supporting structures more efficiently. Indeed, radially-firing laser tips also allow for more effective root surface coverage, especially in difficult to reach areas (e.g., furcations), in closed-flap periodontics applications, and/or in the case of implant decontamination. In addition, laser beam delivery techniques can be used to reduce the hardness of calculus without damaging the root surface and to eliminate subgingival bacteria and endotoxins of implants.

In some applications, the designs described herein enable delivering different laser energy densities into small surface areas, which is very useful for dislodging ledges of calculus on root surfaces, or into larger surface areas at low energy levels. The laser tips can also deliver energy to the bone at the depth of the pocket thereby eliminating bacteria, and can produce degranulation, which stimulates faster healing and regrowth by photobiomodulation.

In various embodiments, radiation (e.g., a laser beam) having a wavelength in the range of about 9-10 μm can be delivered efficiently using an optical element (e.g., a waveguide, a lens, a prism, or the like) housed in a mechanical accessory and can be coupled to the source of the laser beam using a hand piece, such as the hand piece described in U.S. Pat. Nos. 10,182,881 and 9,980,788, the disclosures of both of which are incorporated by reference herein in their entireties. This may be achieved, in part, by using an optical element that is customized for transmitting radiation in a wavelength range of about 9 μm up to about 10 μm. Such an optical element may include ZnS glass and may be shaped to reflect radiation at one specific angle or to diffuse radiation at different angles from the main axis. The optical element may include chalcogenide glass composed of arsenic and selenium, and is further characterized by an absence of at least one of tellurium and germanium, or both. The optical element can be made of Gallium Lithium Selenide (GLS-Se) with presence of selenium with a transmission in the infrared spectrum. The presence of one or more of these compounds in the optical element may be desirable for the transmission of wavelengths greater than 9 μm. Alternatively, or in addition, a chalcogenide fiber may be coupled to another optical fiber that includes silica and/or a fluoride. Such a coupled fiber may transmit radiation in the visible spectrum for marking and/or radiation that can fluoresce depending on the nature of the target tissue, enabling diagnostics of such tissue.

The system may also include a laser source controller than can adjust one or more parameters of the radiation (e.g., laser beam) according to the type of treatment selected and/or the type of tissue being treated. For example, during treatment, the laser beam may be directed to the treatment area, which may include hard and/or soft tissue, through a medium that does not substantially absorb the radiation, allowing for delivery of a specified energy profile at or near the treatment area. Such a medium may include a gas (e.g., air or nitrogen), water, and/or a combination of a gas and water to create a mist.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 4a shows a schematic of a disposable tip design and optical element having a (e.g., metallic-coated) reflective surface, in accordance with some embodiments of the present invention;

FIG. 4b shows an image of a side-firing tip with a 90 degrees emission angle, in accordance with some embodiments of the present invention;

FIG. 7b shows a cross-section of the side-firing disposable tip design and optical element of FIG. 7a; and FIG. 8 shows a table providing exemplary system and operational parameters, in accordance with some embodiments of the present invention.

DETAILED DESCRIPTION

Various embodiments of the present invention are directed to a dental laser apparatus that satisfies one or more of the needs identified above and/or overcomes one or more of the shortcomings of the prior art. These objectives may be achieved, in part, by providing an apparatus having a hand piece that can simultaneously deliver laser pulses and coolant to an oral treatment region. The oral treatment area may include, for the purpose of illustration rather than limitation: between teeth, between teeth and gingiva, and so forth.

For some applications, a carbon dioxide ($CO_2$) laser source operating at a wavelength of about 9.3 microns, i.e., within a wavelength range of 9-10 microns, may be desirable for such oral treatments. More particularly, $CO_2$ lasers operating at 9.3 microns can access challenging locations in the mouth and, furthermore, are well suited for treating soft and hard tissue. Some advantages of laser therapy over conventional methods include reduced bleeding and reduced tissue inflammation. Furthermore, sterilization of the affected area may lead to a reduction in post-treatment discomfort accompanied by higher patient satisfaction.

The hand piece may be rotatably affixed to a main chamber. A groove and sealing mechanism in the hand piece may be used to deliver cooling fluids (e.g., air, water, and combinations thereof) as the hand piece is rotated. Thus, the user (e.g., a dentist, a surgeon, or the like) may rotate the hand piece to direct laser energy to a selected location in the patient's mouth, without interrupting the treatment. The hand piece may include circuitry that stores information about the features of the hand piece such as tip angle, length of the hand piece, and so forth.

The flexibility of the embodied radially-firing devices—whether end-fired or side-fired—to direct radiation emitted from a laser source to a desired location minimizes the amount of work the user (e.g., physician) is required to exert to ensure that the reflected radiation is focused at a desired location.

End-Firing Devices

Figure 2:
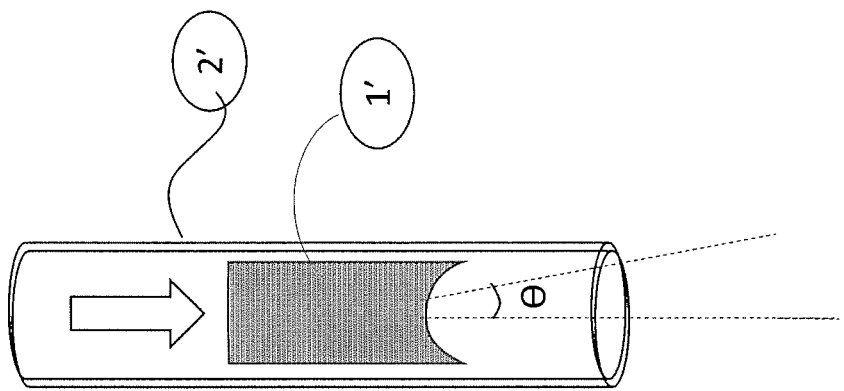
FIG. 2 shows a schematic of a disposable tip design and optical element having a concave surface, in accordance with some embodiments of the present invention.
Figure 1B:
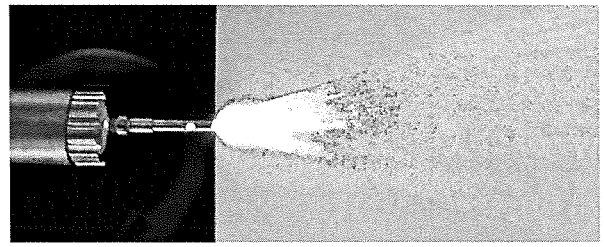
FIG. 1b shows an image of an end-firing tip providing a diverging fan angle, in accordance with some embodiments of the present invention.
Figure 1A:
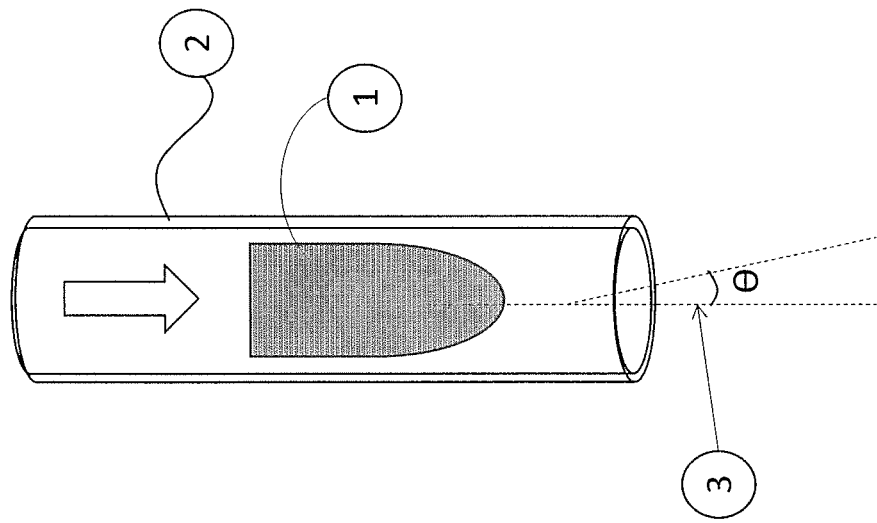
FIG. 1a shows a schematic of a disposable tip design and optical element having a convex surface, in accordance with some embodiments of the present invention.

FIGS. 1a, 1b, and 2 show illustrative embodiments of radially-firing devices for directing radiation emitted by a laser source to an oral treatment area. FIG. 1a shows an illustrative embodiment of a radially-firing device having an optical element 1 with a convex surface, while FIG. 2 shows an image of radiation diverging at an approximately 26 degree angle from a radially-firing device having a convex surface.

Referring to FIGS. 1a and 2, in some implementations, each device or hand piece may be structured and arranged to receive a disposable tip at a distal end of the hand piece. In some variations, the disposable tip may include a hollow housing 2, e.g., a tube, that is open at each of a proximal end and a distal end. The tube 2 may be manufactured using a metal, stainless steel, nickel, a polymer, polyether ether ketone (PEEK), or combinations or alloys thereof and may, in some applications, have a cylindrical or substantially cylindrical shape. An optical element 1, e.g., a cylindrical or substantially cylindrical lens, may be disposed or mounted within the cylindrical housing 2, between the proximal and distal ends. Advantageously, the optical element 1 may be provided for modifying a profile and/or a direction of the radiation emitted from the tube 2.

The cylindrical lens 1 may be manufactured from zinc sulfide (ZnS), gallium lanthanum sulfide (GLS) glass, or chalcogenide glass. Mounting the optical element 1 within the cylindrical housing 2 may include using an adhesive (e.g., cyanoacrylate); an epoxy; a mechanical screw; a tight, interference fit; and so forth. The optical element 1 may be mounted or disposed inside the tip of the housing 2, such that the reflective surface of the optical element 1 is proximate to (e.g., a few millimeters from) the opening in the housing 2, to minimize damaging the optical element.

In some variations, radiation emitted by a laser source may be transmitted through the hand piece to an outlet proximate the disposable tip. For example, the incident radiation may travel along a central axis 3 to a proximal end of the optical element 1 and may, subsequently, pass through the optical element 1. Once the radiation reaches the distal end of the optical element 1, the convex surface of the optical element 1 causes the incident radiation to converge to a focal point and then to diverge from the focal point, such that the incident radiation fans out. In some instances, the focal point may be located between the optical element 1 and the distal end of the cylindrical housing 2, such that the radiation converges to the focal point and begins to diverge before leaving the cylindrical housing 2. Because the fanning out radiation passes through the opening at the distal end of the cylindrical housing 2, the device provides a radially (end)-firing tip. More particularly, the radiation emitted by the laser diverges radially at a fan angle ($\Theta$), which may be determined by, inter alia, the nature of the optical element 1, the radius of curvature and the shape of curvature of the convex surface of the optical element interface, and so forth. For example, in some variations, the fan angle may be up to about 45 degrees.

The disposable tip shown in FIG. 2 also includes a hollow housing 2', e.g., a tube, that is open at each of a proximal end and a distal end. In some implementations, the shape of the housing 2' may be cylindrical or substantially cylindrical. An optical element 1', e.g., a cylindrical lens, may be disposed or mounted within the housing 2', between the proximal and distal ends. Mounting the optical element 1 within the housing 2' may include using an adhesive (e.g., cyanoacrylate); an epoxy; a mechanical screw; a tight, interference fit; and so forth.

In some variations, radiation emitted by a laser source may be transmitted through the hand piece to an outlet proximate the disposable tip. Once the radiation reaches the distal end of the optical element 1', the concave surface of the optical element 1' causes the incident radiation to diverge, such that the incident radiation fans out. Because the fanning out radiation passes through the opening at the distal end of the cylindrical housing 2', the device provides a radially (end)-firing tip. More particularly, the radiation emitted by the laser diverges radially at a fan angle (0), which may be determined by, inter alia, the nature of the optical element 1', the radius of curvature and the shape of curvature of the convex surface of the optical element interface, and so forth. For example, in some variations, the fan angle may be up to about 45 degrees. The optical elements 1' may be mounted or disposed inside the tip of the housing 2', such that the concave surface of the optical element 1' is proximate to (e.g., a few millimeters from) the opening in the housing 2', to minimize damaging the optical element 1'.

Figure 3:
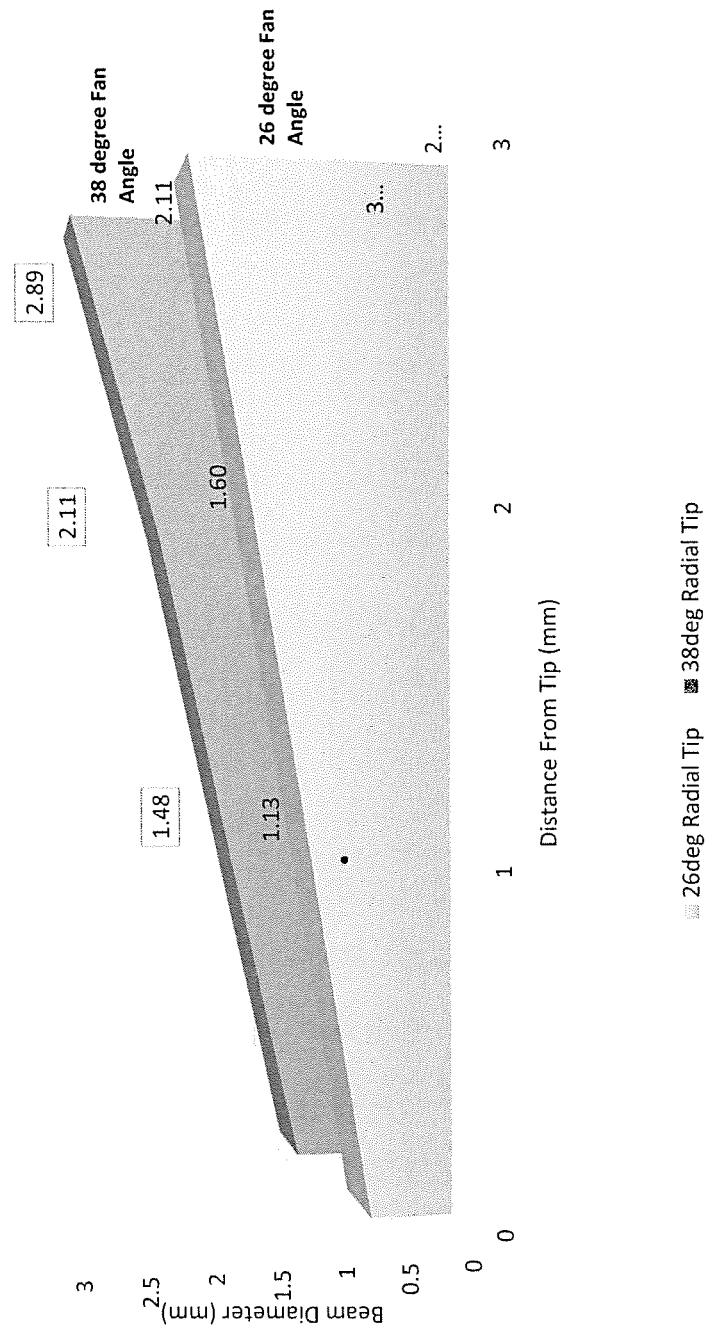
FIG. 3 shows a plot of the measured beam diameter at different locations from the end of the tip of two different optical elements providing 26 and 38 degrees fan angles, in accordance with some embodiments of the present invention.

FIG. 1b shows an image of laser radiation being emitted by a radially (end)-firing tip. The emitted radiation diverges at a fan angle of about 26 degrees. FIG. 3 shows a plot of an exemplary relationship between the beam diameter or beam divergence (ordinate) at different distances from the end of the disposable tips for fan angles of about 26 degrees and about 38 degrees.

Side-Firing Devices

In another embodiment, the optical element may include a reflective surface that radially directs the laser beam sideways, providing a side-firing device. Side-firing devices provide a capability that, conventionally, was only made possible by cleaving an optical fiber at a desired angle. Referring to FIG. 4a, an exemplary disposable, side-firing device is shown. In some embodiments, the disposable tip includes a hollow housing 2", e.g., a tube, that is open at a proximal end but closed at a distal end. In some implementations the housing 2" may have a cylindrical or substantially cylindrical shape. A plug may be mounted at the end of the housing 2" to seal or close the end of the housing 2". The plug may be coated with a reflective material on the side of the plug facing the input laser source. The disposable tip also may include an opening 4 in the sidewall of the housing 2".

An optical element 1", e.g., a cylindrical lens, may be disposed or mounted within the housing 2", between the proximal and distal ends. Mounting the optical element 1" within the housing 2" may include using an adhesive (e.g., cyanoacrylate); an epoxy; a mechanical screw; a tight, interference fit; and so forth. A reflective surface 5 may be provided at or formed in the optical element 1". In some variations, the reflective surface 5 may be formed at a desired angle (e.g., 45°) with respect to the central axis of the incident laser beam. Preferably, the reflective surface 5 may be a planar surface, formed at the distal end of the optical element 1", that has been coated with a metallic material (e.g., gold, silver, copper, and the like) or other reflective material in the near- or far-infrared spectra. Alternatively, the reflective surface may have a contoured surface.

As shown in FIG. 4a, radiation may be directed out through an opening 4 in the sidewall of the housing 2" at an angle of approximately 90 degrees with respect to the incident laser beam after being reflected by a gold-coated mirror 5 formed at a 45-degree angle with respect to the central axis. FIG. 4b shows an image of laser light being emitted by a radially (side)-firing tip. The reflected radiation is emitted at approximately 90 degrees with respect to the central axis of the incident radiation.

Although side-firing the reflected laser beam at about 90 degrees may be accomplished using a reflective surface 5 formed at an angle of about 45 degrees, those of ordinary skill in the art can appreciate that forming reflective surfaces 5 at different angles may result in the reflected laser beam being reflected through the side opening 4 in the sidewall of the housing 2" at a different angle. Thus, the incident laser beam may be directed (reflected) at different angles.

In some variations, a reflective material(s) may be applied to the reflective surface(s) to provide multiple reflective surfaces (e.g., a pyramidal shape) to enable different bi-directional or multidirectional beam reflections. For example, the multiple reflective surfaces may include, for the purpose of illustration rather than limitation, any number (e.g., 1, 2, 4, 6, 8, and so forth) of planar surfaces, which deliver energy in a corresponding number of directions (e.g., 1, 2, 4, 6, 8, and so forth).

Figure 6:
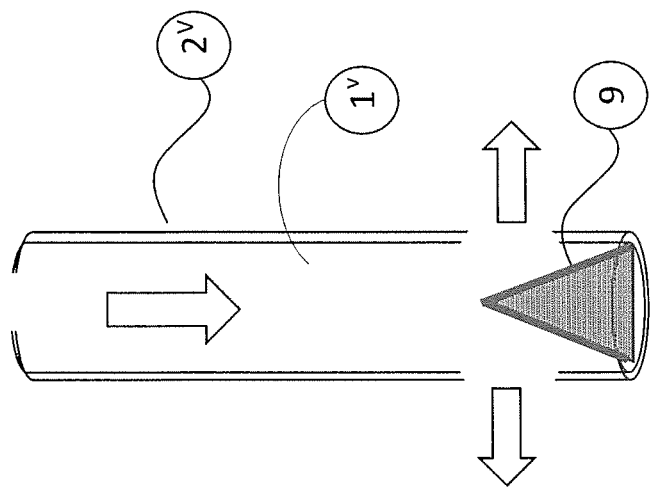
FIG. 6 shows a schematic diagram of a side-firing disposable tip design and conical optical element, in accordance with some embodiments of the present invention.

For example, in a further application, as shown in FIG. 6, the reflective surface 9 may have a conical shape and may be capable of reflecting the incident laser beam radially in 360 degrees. The conical reflective surface 9 may be disposed at or mounted in the distal opening in the housing 2v. Mounting the conical reflective surface 9 in the distal end of the housing 2v may include using an adhesive (e.g., cyanoacrylate); an epoxy; a mechanical screw; a tight, interference fit; and so forth.

Figure 5A:
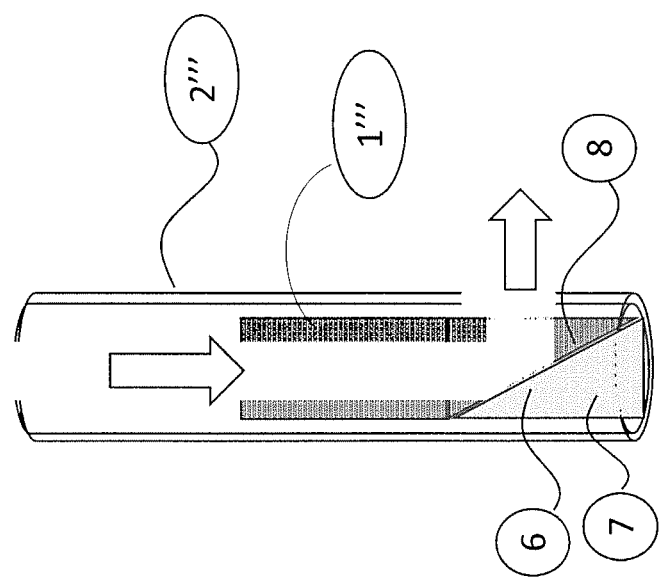
FIG. 5a shows a schematic of a disposable tip design having multiple optical elements with different refractive indices ($n_1$ and $n_2$), in accordance with some embodiments of the present invention.

Alternatively, in lieu of side-firing the laser beam using an angled surface having a reflective coating, the laser beam may be directed (e.g., reflected) from the disposable tip at an angle by one of total internal reflection (TIR), frustrated total internal reflection, or phase shift total internal reflection. For example, as depicted in FIG. 5a, the optical element 1' may include a first optical material 6 having a first refractive index ($n_1$) as well as a second optical material 7 having a second refractive index ($n_2$). A planar interface 8 may separate the first optical material 6 from the second optical material 7. The optical materials and their respective refractive indices may be selected to satisfy Fresnel law of reflection and transmission for perpendicular and parallel polarized light. In such instances, the first refractive index ($n_1$) is greater than the second refractive index ($n_2$).

Thus, if incident radiation encounters an interface between optical materials 6, 7 having different refractive indices (n) after passing through the first optical material 6 having a refractive index ($n_1$) that is greater than the refractive index ($n_2$) of the second refractive material 7, TIR would result, resulting in a side-firing of the incident laser beam, as long as the angle of incidence of the incident light with respect to a line normal to the interface 8 is greater than a critical angle defined by the equation:

$$\Theta c_{rit} = \sin^{-1}(n_2/n_1).$$

Figure 5B:
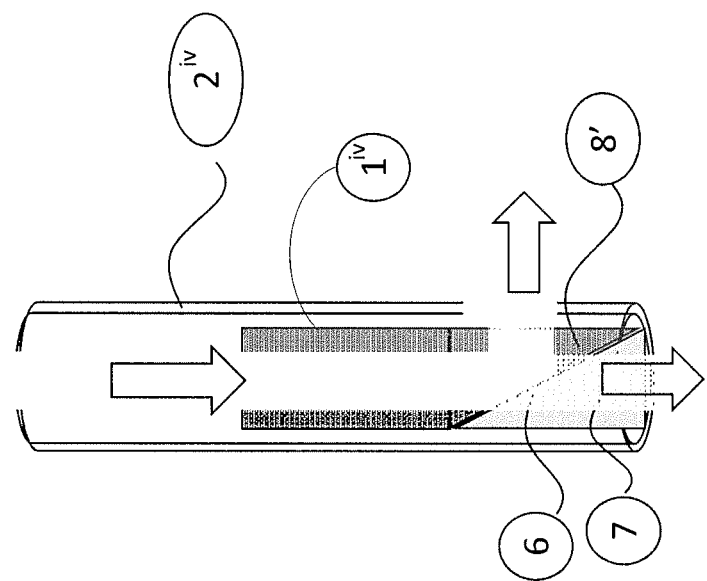
FIG. 5b shows a schematic of the disposable tip design in FIG. 5A that also transmits the light beam along the central axis of light incidence, in accordance with some embodiments of the present invention.

As shown in FIG. 5b, in another embodiment, the first optical material 6 and the second optical material 7 may be made of two triangular prisms that may be chosen with specific refractive indices to permit both transmission (e.g., along the central axis) or the incident laser light through the distal end of housing $2^{iv}$ and reflection (e.g., side-firing) through a side opening in the housing $2^{iv}$. The reflection may be due to frustrated total internal reflection. In another variation, a beam splitter may be a polarizing beam splitter, e.g., using birefrinent material, splitting the beam of different polarization.

For different applications, the laser beam may be spatially scanned in a "pattern" to provide energy delivery uniformly across a larger spot size on the target tissue than the native laser beam. In another application, the laser-scanning pattern may allow the laser beam to travel in a medium within its thermal relaxation time to avoid any thermal buildup. This variant may allow for high power (energy) delivery of the laser beam for, for example, cutting soft tissue, removing calculus, and so forth.

Figure 7A:
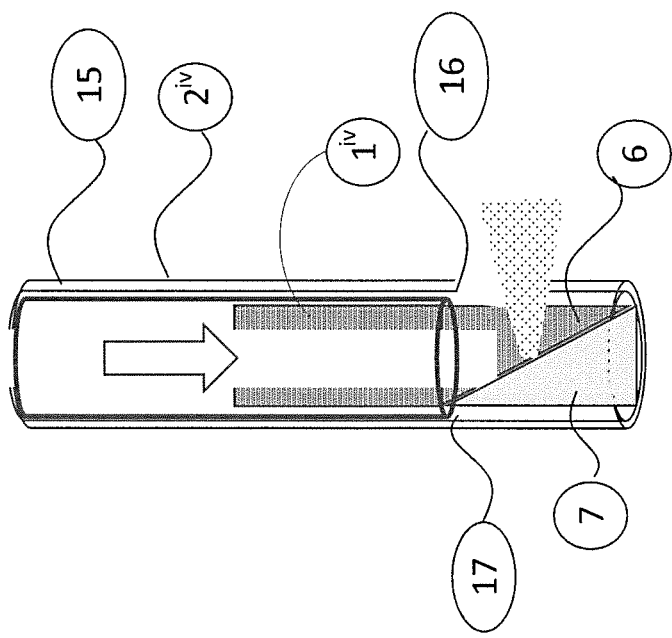
FIG. 7a shows a schematic diagram of a side-firing disposable tip design and optical element having a cooling system, in accordance with some embodiments of the present invention.
Figure 7B:
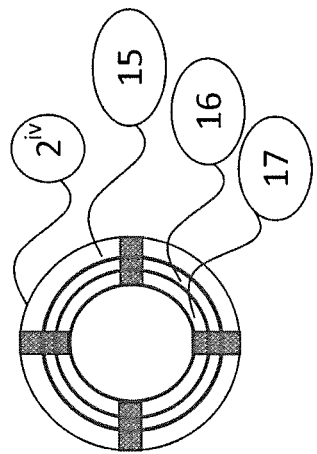

Referring to FIGS. 7a and 7b, in yet another embodiment, optionally, a cooling system may also be operatively coupled (e.g., via an inlet(s) connected to a coolant source(s)) to an outlet formed in the disposable tip. For example, the cooling system may include a plurality of nested tubes 15, 16, 17 that form a plurality of coolant flow paths therebetween. Although the nested tubes 15, 16, 17 shown in the figures are disposed coaxially and concentrically within the housing $2^{iii}$, that is done for illustrative purposes. In some variations, the nested tubes 15, 16, 17 may be configured eccentrically.

For concentric and coaxial tubes, in one implementation, a first cooling tube 15 may be fixedly attached to the inner surface of the tube forming the housing $2^{iv}$, such that an internal cooling fluid may be forced through the plenum space formed between the first cooling tube 15 and the tube forming the housing $2^{iv}$; a second cooling tube 16 may be fixedly attached to the inner surface of the first cooling tube 15, such that a first cooling fluid may be forced through the plenum space formed between the first 15 and the second cooling tubes 16; and a third cooling tube 17 may be fixedly attached to the inner surface of the second cooling tube 16, such that a second cooling fluid may be forced through the plenum space formed between the second 16 and the third cooling tubes 17.

The cooling fluids circulated by the cooling system may include fluids, such as air, water, and combinations thereof (e.g., mist). For example, air may be forced down one of the plenum spaces, while water is forcing down another plenum space. Coolant may be delivered into the various plenum spaces from a coolant source(s) via the hand piece and an inlet.

Referring to FIG. 8, device parameters are summarized in a table. Laser parameters (e.g., power, repetition rate, pulse duration, and laser beam overlap) may be designed to have an optimal outcome of efficiency to remove diseased tissue or bone without damaging the material (i.e., optical element) itself. However, those skilled in the art can appreciate that the laser source may be spatially scanned to provide different pulse energy at different directions/locations. Such scanning can be beneficial in treating, in a single step, the hard tissue (using high energy pulses on one side of the periodontic pocket) and soft tissue (using low energy settings on the other side of the periodontal pocket), thus reducing the steps and time of procedure.

FIG. 8 provides minimum, maximum, and nominal values for certain parameters related to the configuration and operation of the system described herein, according to some embodiments. Every value between the minimum value and the maximum value for each parameter shown in FIG. 8 (not just the nominal value), is contemplated and expressly supported herein, subject to the number of significant digits expressed in each particular range.

Having described herein illustrative embodiments of the present invention, persons of ordinary skill in the art will appreciate various other features and advantages of the invention apart from those specifically described above. It should therefore be understood that the foregoing is only illustrative of the principles of the invention, and that various modifications and additions can be made by those skilled in the art without departing from the spirit and scope of the invention. Accordingly, the appended claims shall not be limited by the particular features that have been shown and described, but shall be construed also to cover any obvious modifications and equivalents thereof.

What is claimed is:

1. A device for directing radiation emitted by a laser source through a hand piece to an oral treatment area, the device comprising:
    a disposable tube attachable to an outlet of the hand piece and comprising at least one opening along a sidewall of the tube for directing radiation radially; and
    a lens, disposed completely within the tube, for modifying at least one of a profile or a direction of radiation emitted from the tube, wherein the radiation is emitted from the laser source having a single wavelength and at a single power level, and wherein the lens comprises a first optical material having a first refractive index ($n_1$) and a second optical material having a second refractive index ($n_2$), such that the first refractive index ($n_1$) and the second refractive index ($n_2$) permit transmission of the radiation through the opening along the sidewall and through a distal end of the disposable tube.

2. The device of claim 1, wherein the lens comprises a cylindrical lens.

3. The device of claim 1, wherein the lens comprises a lens fabricated from zinc sulfide (ZnS), gallium lanthanum sulfide (GLS) glass, or chalcogenide glass.

4. The device of claim 1, wherein the lens comprises a convex surface.

5. The device of claim 4, wherein the convex surface causes the radiation to converge towards a focal point from the convex surface and to diverge radially at a fan angle from the focal point.

6. The device of claim 5, wherein the fan angle is up to 45 degrees.

7. The device of claim 1, wherein the lens comprises a concave surface.

8. The device of claim 7, wherein the concave surface causes the radiation to diverge radially at a fan angle from the concave surface.

9. The device of claim 1, wherein the disposable tube comprises an opening at a distal end for emitting the radiation from the tube.

10. The device of claim 1, wherein the disposable tube further comprises at least one opening at a distal end of the tube for directing radiation axially.

11. The device of claim 1, wherein the lens comprises at least one reflective surface.

12. The device of claim 11, wherein the reflective surface comprises a planar surface.

13. The device of claim 11, wherein the at least one reflective surface comprises a substrate coated with a metallic material.

14. The device of claim 13, wherein the metallic material is selected from the group consisting of gold, silver, copper, a reflective material for reflecting a beam of radiation having a wavelength within the infrared spectrum, and combinations thereof.

15. A system for dental or surgical treatment of oral tissue, the system comprising:
    a laser source;
    a hand piece operatively coupled to the laser source; and
    a device for directing radiation emitted by the laser source through the hand piece to an oral treatment area, the device comprising:
        a disposable tube attachable to the hand piece and comprising at least one opening along a sidewall of the tube for directing radiation radially; and
        a lens, disposed completely within the tube, for modifying at least one of a profile or a direction of the radiation emitted from the tube, wherein the radiation is emitted from the laser source having a single wavelength and at a single power level, and wherein the lens comprises a first optical material having a first refractive index ($n_1$) and a second optical material having a second refractive index ($n_2$), such that the first refractive index ($n_1$) and the second refractive index ($n_2$) permit transmission of the radiation through the opening along the sidewall and through a distal end of the disposable tube.

16. A method for dental or surgical treatment of oral tissue, the method comprising:
    emitting radiation, by a laser source, at a single wavelength and single power level along a central axis; and
    directing radiation emitted by the laser source, by a device, through a hand piece to an oral treatment area, the device comprising:
        a disposable tube attachable to the hand piece and comprising at least one opening along a sidewall of the tube for directing radiation radially; and
        a lens disposed completely within the tube, wherein the lens comprises a first optical material having a first refractive index ($n_1$) and a second optical material having a second refractive index ($n_2$), such that the first refractive index ($n_1$) and the second refractive index ($n_2$) permit transmission of the radiation through the opening along the sidewall and through a distal end of the disposable tube.

17. The device of claim 1, wherein the lens comprises a reflective surface and is adapted to cause the radiation to converge towards a focal point located within the tube and to diverge before exiting the tube.

18. The system of claim 15, wherein the lens comprises a reflective surface and is adapted to cause the radiation to converge towards a focal point located within the tube and to diverge before exiting the tube.

19. A device for directing radiation emitted by a laser source through a hand piece to an oral treatment area, the device comprising:
- a disposable tube attachable to an outlet of the hand piece and comprising at least one opening along a sidewall of the tube for directing radiation radially; and
- a lens, disposed completely within the tube, for modifying at least one of a profile or a direction of radiation emitted from the tube, wherein the radiation is emitted from the laser source having a single wavelength and at a single power level, and wherein the lens comprises a first optical material having a first refractive index ($n_1$) and a second optical material having a second refractive index ($n_2$), such that the first refractive index ($n_1$) is greater than the second refractive index ($n_2$).

20. The device of claim 1, wherein the first optical material comprises a first triangular prism and the second optical material comprises a second triangular prism.

21. The system of claim 15, wherein the first optical material comprises a first triangular prism and the second optical material comprises a second triangular prism.

* * * * *